(12) United States Patent
Asack et al.

(10) Patent No.: US 7,606,765 B1
(45) Date of Patent: Oct. 20, 2009

(54) TELEVISION CREDIT CARD SYSTEM

(76) Inventors: Robert M. Asack, 35 Satucket Ave., East Bridgewater, MA (US) 02333-1950; Denise A. Asack, 35 Satucket Ave., East Bridgewater, MA (US) 02333-1950

( * ) Notice: Subject to any disclaimer, the term of this patent is extended or adjusted under 35 U.S.C. 154(b) by 1957 days.

(21) Appl. No.: 10/189,744

(22) Filed: Jul. 8, 2002

(51) Int. Cl.
G06Q 30/00 (2006.01)
H04N 7/173 (2006.01)

(52) U.S. Cl. .......................... 705/40; 725/104
(58) Field of Classification Search ............. 705/39–40, 705/44, 77, 400; 725/1–2, 8, 62–63, 86–87, 725/104; 348/61
See application file for complete search history.

(56) References Cited

U.S. PATENT DOCUMENTS

| | | |
|---|---|---|
| 2,731,620 A | 1/1956 | Gottfried |
| 3,387,083 A | 6/1968 | Farber et al. |
| 3,508,005 A | 4/1970 | Hamburger |
| 3,531,582 A | 9/1970 | Walker |
| 3,531,586 A | 9/1970 | Bass et al. |
| 3,736,368 A | 5/1973 | Vogelman et al. |
| 3,890,461 A | 6/1975 | Vogelman et al. |
| 3,894,176 A | 7/1975 | Mellon |
| 3,920,908 A | 11/1975 | Kraus |
| 4,008,369 A | 2/1977 | Theurer et al. |
| 4,081,832 A | 3/1978 | Sherman |
| 4,325,078 A | 4/1982 | Seaton et al. |
| 4,358,672 A | 11/1982 | Hyatt et al. |
| 4,567,512 A | 1/1986 | Abraham |
| 4,710,955 A | 12/1987 | Kauffman |
| 4,751,732 A | 6/1988 | Kamitake |
| 4,893,248 A | 1/1990 | Pitts et al. |
| 5,003,384 A | 3/1991 | Durden et al. |
| 5,070,400 A | 12/1991 | Lieberman |
| 5,173,589 A | 12/1992 | Diehl et al. |
| 5,319,454 A | 6/1994 | Schutte |
| 5,475,740 A * | 12/1995 | Biggs et al. .............. 379/91.02 |
| 5,602,581 A | 2/1997 | Ozaki |
| 5,794,115 A | 8/1998 | Saito |
| 5,973,756 A | 10/1999 | Erlin |
| 6,057,872 A | 5/2000 | Candelore |
| 6,275,991 B1 | 8/2001 | Erlin |
| 2003/0182194 A1 * | 9/2003 | Choey et al. ................. 705/16 |

OTHER PUBLICATIONS

Janet L. Fix, "Paying Bills by TV // AT&T Launches Remote Service", USA Today, Mclean , VA, Jun. 7, 1995, p. 02 B.*

* cited by examiner

Primary Examiner—Mary Cheung
(74) Attorney, Agent, or Firm—Donald R. Schoonover

(57) ABSTRACT

A credit card is used to purchase services, such as special pay-per-view television events, when the purchaser is located remote from his or her home base. When a subscriber is in a location remote from his or her base, that is, out of his or her subscription area, and wishes to view an event that is carried by his or her subscription service but which is not carried by the carrier serving the remote location, the purchaser contacts the system that is offering the event by telephone for example and uses a credit card that is issued by the system to purchase the event.

11 Claims, 2 Drawing Sheets

TELEVISION CREDIT CARD SYSTEM

BACKGROUND OF THE INVENTION

1. Field of the Invention

The present invention relates to the general art of business methods, and to the particular field of credit cards.

2. Discussion of the Related Art

Travel in the United States and elsewhere has substantially increased in recent years. More and more people are traveling both for business and for pleasure. People are so mobile that they can be away from home for extended periods of time yet can conduct their business and daily affairs as though they were at home.

Many people enjoy watching television, especially when they are away from home. Many parents find television an efficient mode of entertaining their children while on vacation. The viewing industry has grown in conjunction with changes in modern life styles, including the just-mentioned mobility.

Television now offers a multitude of choices for the viewer. These choices include free television, Public Television, cable television, satellite television and viewing over the Internet. Most viewing options are localized. That is, a certain program will be offered at one time in one area and at another time in another area. The cable and satellite systems are pay systems in that a viewer pays for a basic package and can add additional packages for extra fees. The basic packages offered by the pay systems vary. For example, one system may include a sports channel in its basic package while another system may not include the same sports channel in its basic package and treat that channel as a premium channel that must be separately purchased. This may be true even if the same parent company owns both systems.

Thus, if a person is accustomed to watching a particular program at home and is away from home and is in an area not served by the system that serves his home, he may not be able to watch a particular show when he is away from home.

This situation may be particularly striking in the case of pay-per-view events, such as movies, concerts, sporting events or the like. If a person is at home, he or she merely calls the pay system and requests the pay-per-view event and the system can bill the person using that person's telephone number. However, if the person is away from home, even at a neighbor's home, that person may not be able to call up the system and request that the pay-per-view event be sent to the remote location (i.e., a location not the person's home). This is especially true if the remote location is not served by the person's home pay system. The person at the remote location thus will be forced to miss the event, or to charge it to the remote location.

Therefore, there is a need for a method for offering home-based events to locations remote from the home base.

Still further, many pay systems are always seeking means of generating new revenue. One means would be to offer a wider variety of programming. However, due to copyrights, fees and the like, this may not be economical for some companies. However, if a particular pay system had access to a wider variety of offerings, it could offer such services on a pay-per-event basis with the cost of such offering reflecting the additional costs associated with carrying that event to a requesting party.

Therefore, there is a need for a method for pay systems to offer a wider variety of services and programs.

Pay systems are also generally looking for methods for promoting themselves and for offering promotions that increase their subscriber base. Therefore, there is a need for a method which permits a pay system to promote itself and to promote increased usage of its services and products.

Many parents wish to monitor the television viewing of their children. This is always difficult, even at home. However, it is even more difficult when the children are away from home. Still further, many advertisers and networks wish to monitor the viewing habits of the viewers. This is often done with surveys and by special companies. While these methods have proved to be very accurate, there is always a need for additional tools for determining the data associated with television viewing.

There is a need for a method for monitoring viewing habits of both children and adults.

It is also noted that many systems offer goods as well as services. Such systems are always seeking ways to improve the efficiency of such offerings as well as a convenient method for tracking the success of various offerings. Therefore, there is a need for a method for improving the efficiency of selling goods and services over pay systems.

It is also noted that for purposes of convenience, the present disclosure will be primarily directed to television-type viewing. However, while the present disclosure will primarily be directed to television type systems, it is contemplated that the teaching of the disclosure will also be applicable to other systems as well, including, but not limited to, Internet, radio, and the like.

PRINCIPAL OBJECTS OF THE INVENTION

It is a main object of the present invention to provide a method for offering home-based events to locations remote from the home base.

It is another object of the present invention to provide a method for pay systems to offer a wider variety of services and programs.

It is another object of the present invention to provide a method which permits a pay system to promote itself and to promote increased usage of its services and products.

It is another object of the present invention to provide a method for monitoring viewing habits of both children and adults.

It is another object of the present invention to provide a need for a method for improving the efficiency of selling goods and services over pay systems.

It is another object of the present invention to provide a method for providing pay-per-view movies to locations that are remote from a subscriber's home base.

It is another object of the present invention to provide a method for increasing the scope and variety of the offerings for any single pay system.

It is a specific object of the present invention to provide a method for purchasing pay-per-view events, including movies, from a location that is remote from a viewer's home base.

It is another specific object of the present invention to provide a method for purchasing offerings from a pay system that is not a subscriber's home base system.

It is another object of the present invention to provide a method for a plurality of pay systems to share subscribers and share revenue generated by such shared subscribers.

It is another object of the present invention to provide a method for producing additional revenue streams for pay systems.

SUMMARY OF THE INVENTION

These, and other, objects are achieved by a method of ordering and paying for viewing events which comprises:

providing a pay-viewing system having a multiplicity of offerings; providing a subscriber account in the pay-viewing system; sending a bill to a subscriber at a billing location which charges the subscriber for usage of the pay-viewing system; identifying a home base for the subscriber; providing the subscriber with a credit card associated with events offered by the pay-viewing system; locating the subscriber at a location remote from the home base; ordering an offering from the pay-viewing system to be sent to the subscriber at the remote location by the pay-viewing system by communicating with the pay-viewing system from the remote location, identifying the credit card which will be charged for the offering, identifying the event being ordered for delivery at the remote location, identifying the remote location as being a receiving location to which the pay-viewing system is to send the event being ordered, providing information regarding the remote location, and authorizing payment for the event to be charged to the credit card; charging the credit card with a charge according to the event ordered on the credit card; and billing the subscriber at the home base according to charges on the credit card. The method can further include steps of providing a second pay-viewing system; providing a central station; associating the central station with both the pay-viewing system and the second pay-viewing system with the step of communicating with the pay-viewing system including a step of communicating with the second pay-viewing system with the communication between the subscriber and the pay-viewing system and/or the second pay-viewing system being via the central station; and the central station relaying the request of the subscriber.

If the credit card is lost or stolen, unauthorized use of the card can be traced by reviewing the records of the remote location, or locations, to which requested events have been sent.

The use of the credit card can be tracked to monitor viewing habits of the credit card users and thus can be used in all manner of ways associated with such tracking of viewing habits. Parents can limit the credit card used by their children to certain events and prohibit purchase of other events and thereby exert some control over the viewing habits of their children. A parent can even make use of the credit card mandatory even from the home base to purchase certain events and thereby exert control over the viewing habits of their children even at home. Still further, by providing additional offerings, a single pay system will increase its revenue while increasing its service to its subscribers. By combining, several pay systems can combine their resources and offer their subscribers increased services. The credit card can be used as a promotion in and of itself. That is, credit card holders can receive a magazine that lists all of the offerings of all of the systems that subscribe to the credit card, or the card can offer rebates, or the card itself can have logos on it.

BRIEF DESCRIPTION OF THE DRAWING FIGURES

DETAILED DESCRIPTION OF THE INVENTION

Other objects, features and advantages of the invention will become apparent from a consideration of the following detailed description and the accompanying drawings.

The method embodying the present invention permits a person who subscribes to a particular pay-viewing service, such as a cable service or the like, to receive programs at a location that is remote from his or her home station. That is, for example, if the subscriber is on vacation and is away from home, but wishes to receive a program offered by his or her home system, that subscriber can simply call up a telephone number and order the desired event and have any charges associated with that event billed to a credit card that is unique to the pay system, that is, issued by the pay system, either the home based system or a system associated with the home based system. The desired viewing event can then be sent to the subscriber at a location remote from his or her home. This can be done even if the same parent company owns both the home base system and the remote system. In one embodiment envisioned for the method of the present invention, a plurality of separate systems can all subscribe to a single service that has a central station. Subscribers from any of the separate systems can then call up the central station from any of the subscribing systems and order any event offered by his or her home system even if the subscriber is away from home and is located in a location to which service is supplied by one of the systems that subscribe to the network serviced by the central station.

For example, if a person, who subscribes to a system that offers a particular television show on a particular night, is away from home at a remote location (such as on vacation) and still wishes to view this show, but the system supplying service to the remote location does not carry that show, the person can simply call up either his home base service provider or the remote service provider if the home base service provider and the remote service provider have an appropriate arrangement, such as a central station as herein described, and have that show relayed to him at the remote location via the system that supplies service to the remote location. Appropriate billing arrangements can be made between the two service providers with appropriate payments being made to any copyright holder, with all costs being passed on to the customer via his or her credit card.

Figure 1:
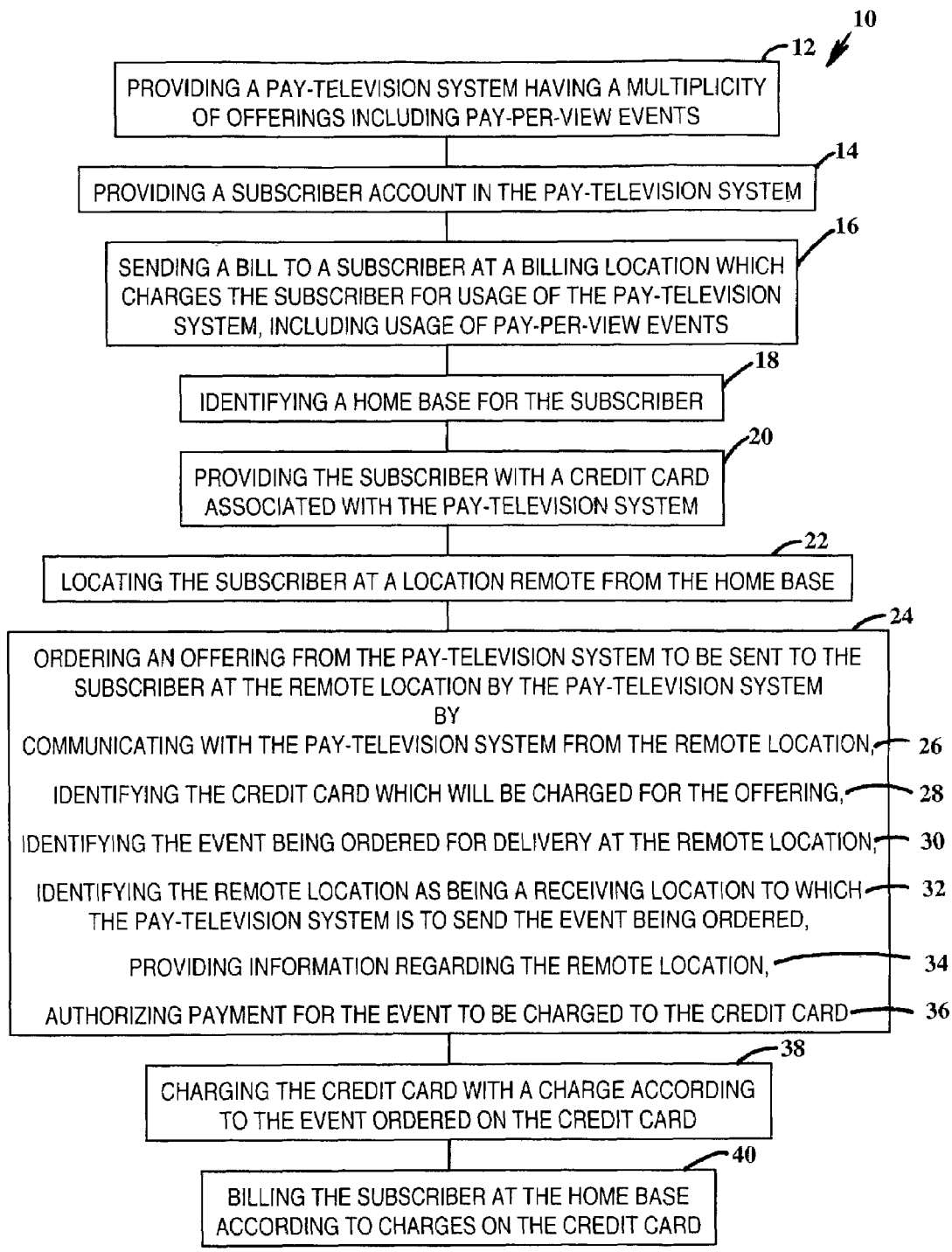
FIG. 1 is a block diagram showing the steps included in the method embodying the present invention.

Referring specifically to FIG. 1, it can be seen that the present invention is embodied in a method 10 of ordering and paying for pay-per-view events which comprises providing in step 12 a pay-television system such as a cable network, a satellite network, or the like, having a multiplicity of offerings including pay-per-view events, regular programs, network programs, cable programs and the like. Any offering that is or can be made over such pay networks can be included in the scope of the present invention as will occur to those skilled in the art. In fact, public television as well as network television can be included in the scope of the present invention. Thus, while the term "pay" is used, it is intended to cover free systems as well.

Method 10 is continued by providing in step 14 a subscriber account in the pay-television system. Such accounts are generally home or residence or business accounts at which one or more television sets or other receivers are located. The method further comprises a step 16 of sending a bill to a subscriber at a billing location which charges the subscriber for usage of the pay-television system, including usage of pay-per-view events. The bill can be a monthly base bill to which is added charges for special services, such as pay-per-view events or movies or the like. In some instances, the base station can send as well as receive, and the charges can include services associated with sending as well as receiving as will occur to those skilled in the art. For example, it may be possible to order certain non-viewing services via the receiver/transmitter in a subscriber's home and the bill received from the service provider will reflect these services as well. Also, certain goods are associated with the system and can be ordered and paid for with the bill sent from the provider. One common item that is often reflected in a bill of this sort is the bill for renting a television remote control. Other items can also be ordered and paid for in this manner as will occur to those skilled in the art. A home base for the subscriber is identified in step 18. For this reason, the following disclosure will also refer to the system as a pay-for-services/goods system to encompass all of the additional services and goods that can be purchased or used in this manner. It is understood that while specific goods and/or services may be referred to in this disclosure, it is intended that the disclosure will cover any of the goods and/or services that are bought and/or transferred in this manner, that is, services and/or goods that are bought or transferred via a television-type system.

The subscriber is provided in step 20 with a credit card associated with the pay-for-services/goods system. The credit card is specific to the pay-for-services/goods system and can thus include a logo that is specific to a system. Other advantages can be associated with the credit card, such as discounts on other services and/or goods for use of the credit card, or points can be awarded for each use of the credit card with the points being accumulated and used to purchase selected goods and/or services.

The method of the present invention is used when the subscriber is at a location remote from his or her home base, such as when the subscriber is on vacation or is at a friend's house or the like. Thus, the method includes a step 22 which locates the subscriber away from home base.

While away from home base, the subscriber can order an offering from the pay system to be sent to the subscriber at the remote location by the system in step 24 by communicating with the pay system from the remote location in step 26, the communication can be via the telephone, via the Internet, or even by mail or fax if the subscriber has a lead time to make prior arrangements for the viewing. The viewer can communicate with either his home base system, if the remote system and the home base system are combined either by ownership of by joining with each other to offer the services associated with the method embodying the present invention, the viewer can communicate with the remote system. In one form of the method embodying the present invention, the viewer can communicate with a central station that services a plurality of pay systems. In step 28, the credit card which will be charged for the offering is identified and, in step 30, the event being ordered for delivery at the remote location is identified. For example, if a special movie or the like is desired, this movie, its time, its channel, any special codes and the like, are identified in the communication. Of course, this method will also apply to other special events, including concerts, sporting events or even shows that are regularly scheduled on the home base system but are not scheduled or carried on the remote system.

The remote location as being a receiving location to which the pay system is to send the event being ordered is identified in step 32. Information regarding the remote location such as address, special codes telephone number or the like is provided in step 34. Payment for the event to be charged to the credit card is authorized in step 36 by providing any pin numbers or other credit card numbers, expiration dates, or the like as deemed necessary by the agency issuing the credit card.

The credit card is charged in step 38 with a charge according to the event ordered on the credit card and the subscriber is billed at the home base according to charges on the credit card in step 40. Any transfer fees, taxes, copyright fees or the like are included in the charge sent to the subscriber.

Figure 2:
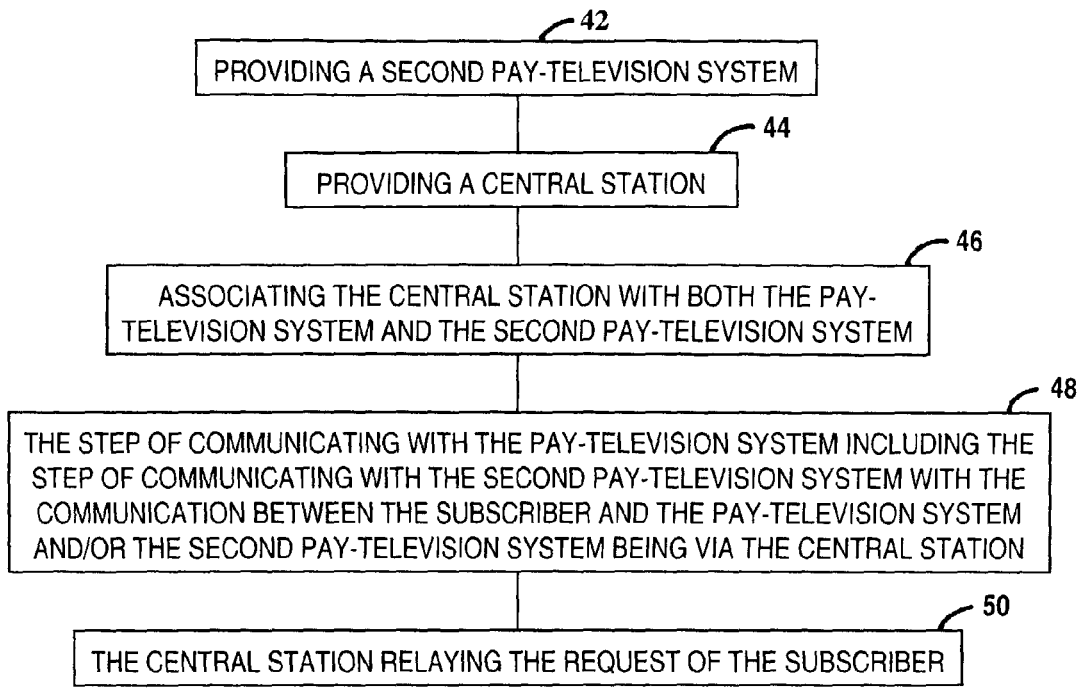
FIG. 2 is a block diagram showing additional steps that can be included in the method embodying the present invention in which a central station is used in conjunction with a plurality of pay-viewing systems to process requests made by subscribers to individual ones of the pay-viewing systems.

As shown in FIG. 2, the method can include a system for permitting a plurality of separate systems to provide the above-described service to their own subscribers by providing a second pay system in step 42. The second pay system can be similar to the first pay system and merely located in an area remote from the first pay system, such as in another State, or the like, or the second pay system can provide services and/or goods that are different from the services and/or goods provided by the first pay system. In this manner, a subscriber may have access to a wide variety of services and/or goods through the use of a single credit card. To achieve this feature, a central station is provided in step 44. The central station can be an office in one of the pay systems or it can be a separate office at a location which is remote from all of the pay systems that use the central station. The central station is associated with both the pay system and the second pay system in step 46. Communication by the subscriber with any of the pay systems associated with the central station is via the central station as indicated in step 48. This permits the central station to keep accurate and complete records of any and all transactions involving the credit cards. A billing record can be sent by the central station to each of the pay systems associated with the central station. The pay systems associated with the central station can divide up revenue any way they deem appropriate. Thus, for example, a system originating a service or goods sale may receive a certain percentage of the sale with the system carrying the service or goods to the subscriber may also receive a percentage of the sale, with the central station receiving a fee for each transaction. Other billing set-ups will occur to those skilled in the art based on the teaching of the present disclosure and such systems are intended to be included in the scope of this disclosure as well. The central station relays the request of the subscriber to the appropriate location in step 50.

The separate systems can be located in separate geographic areas, including in separate States, or even separate countries or the like, if desired.

It is noted that while the above description is directed to pay-television systems, other systems, including Internet-type systems, radio-type systems, viewing only systems, information systems and the like can also be included in the method embodying the present invention without departing from the scope of the present disclosure. The billing can be done by the home base system, or the remote system, or by the central station itself. Furthermore, the central station can be part of one of the systems or a separate entity.

Figure 3:
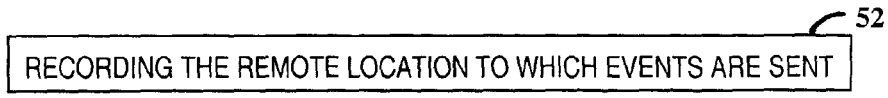
FIG. 3 is a block diagram showing an additional step that can be included in the method embodying the present invention in which a lost or stolen credit card can be traced.

In the event a credit card is lost or stolen, it behooves the system issuing the credit card to be able to trace use of the card. Of course, the card could, and should, be canceled immediately when the card holder notices that the card is missing. However, if the issuing system wishes to track fraudulent use of the card, the method embodying the present invention provides a convenient method for achieving this result. Thus, as shown in FIG. 3, the method of the present invention includes a step of recording the remote location to which services, goods or the like are sent in step 52. The issuing system merely tracks the remote locations at which service is requested using the credit card and traces use of the card backwards from the remote locations. Of course, the remote location can be billed for any unauthorized use of the credit card. It is also noted that this tracking process can be used by parents to track what programs, services or goods their children are ordering. The credit card can be authorized in a certain manner such that certain events, services or goods cannot be purchased using the credit card. In this manner, a parent can block out certain events, such as certain movies, from being purchased using the credit card.

It is understood that while certain forms of the present invention have been illustrated and described herein, it is not to be limited to the specific forms or arrangements of parts described and shown.

We claim:

1. A method of ordering and paying for pay-per-view events comprising:
   a) providing a pay-television system having a multiplicity of offerings including pay-per-view events;
   b) providing a subscriber account in the pay-television system;
   c) sending a bill to a subscriber at a billing location which charges the subscriber for usage of the pay-television system, including usage of pay-per-view events;
   d) identifying a home base for the subscriber;
   e) providing the subscriber with a credit card associated with the pay-television system;
   f) locating the subscriber at a location remote from the home base;
   g) ordering an offering from the pay-television system to be sent to the subscriber at the remote location by the pay-television system by
      (1) communicating with the pay-television system from the remote location,
      (2) identifying the credit card which will be charged for the offering,
      (3) identifying the event being ordered for delivery at the remote location,
      (4) identifying the remote location as being a receiving location to which the pay-television system is to send the event being ordered,
      (5) providing information regarding the remote location, and
      (6) authorizing payment for the event to be charged to the credit card;
   h) charging the credit card with a charge according to the event ordered on the credit card;
   i) billing the subscriber at the home base according to charges on the credit card;
   j) providing a second pay-television system;
   k) providing a central station; and
   l) associating the central station with both the pay-television system and the second pay-television system; and
   m) wherein the step of communicating with the pay-television system includes a step of communicating between the pay-television system and the second pay-television system via the central station and the central station relaying the request of the subscriber.

2. The method as described in claim 1 further including step of the central station billing the pay-television system or the second pay-television system according to the events ordered by credit card.

3. The method as described in claim 1 further including wherein the pay-television system provides service to the home base for the subscriber and does not provide service to the remote location and further wherein the second pay-television system provides service to the remote location and does not provide service to the home base for the subscriber.

4. The method as described in claim 1 further including a step of locating the second pay-television system in a geographic area remote from the pay-television system.

5. The method as described in claim 4 wherein the pay-television system is located in one State and the second pay-television system is in a second State.

6. The method as described in claim 1 wherein the step of billing the subscriber according to charges on the credit card is conducted by the central station.

7. The method as described in claim 1 wherein the central station is part of the pay-television system.

8. A method of ordering and paying for pay-per-view events comprising:
   a) providing a pay-viewing system having a multiplicity of offerings including pay-per-view events;
   b) providing a subscriber account in the pay-viewing system;
   c) sending a bill to a subscriber at a billing location which charges the subscriber for usage of the pay-viewing system, including usage of pay-per-view events;
   d) identifying a home base for the subscriber;
   e) providing the subscriber with a credit card associated with pay-per-view events offered by the pay-viewing system;
   f) locating the subscriber at a location remote from the home base;
   g) ordering an offering from the pay-viewing system to be sent to the subscriber at the remote location by the pay-viewing system by
      (1) communicating with the pay-viewing system from the remote location,
      (2) identifying the credit card which will be charged for the offering,
      (3) identifying the event being ordered for delivery at the remote location,
      (4) identifying the remote location as being a receiving location to which the pay-viewing system is to send the event being ordered,
      (5) providing information regarding the remote location, and
      (6) authorizing payment for the event to be charged to the credit card;
   h) charging the credit card with a charge according to the event ordered on the credit card;
   i) billing the subscriber at the home base according to charges on the credit card;
   j) providing a second pay-viewing system;
   k) providing a central station; and
   l) associating the central station with both the pay-viewing system and the second pay-viewing system; and
   m) wherein the step of communicating with the pay-viewing system includes a step of communicating between the pay-viewing system and the second pay-viewing system via the central station and the central station relaying the request of the subscriber.

9. A method of ordering and paying for viewing events comprising:
   a) providing a pay-viewing system having a multiplicity of offerings;
   b) providing a subscriber account in the pay-viewing system;
   c) sending a bill to a subscriber at a billing location which charges the subscriber for usage of the pay-viewing system;
   d) identifying a home base for the subscriber;
   e) providing the subscriber with a credit card associated with events offered by the pay-viewing system;

f) locating the subscriber at a location remote from the home base;
g) ordering an offering from the pay-viewing system to be sent to the subscriber at the remote location by the pay-viewing system by
   (1) communicating with the pay-viewing system from the remote location,
   (2) identifying the credit card which will be charged for the offering,
   (3) identifying the event being ordered for delivery at the remote location,
   (4) identifying the remote location as being a receiving location to which the pay-viewing system is to send the event being ordered,
   (5) providing information regarding the remote location, and
   (6) authorizing payment for the event to be charged to the credit card;
h) charging the credit card with a charge according to the event ordered on the credit card;
i) billing the subscriber at the home base according to charges on the credit card;
j) providing a second pay-viewing system;
k) providing a central station; and
l) associating the central station with both the pay-viewing system and the second pay-viewing system; and
m) wherein the step of communicating with the pay-viewing system includes a step of communicating between the pay-viewing system and the second pay-viewing system via the central station and the central station relaying the request of the subscriber.

10. The method as described in claim 9 wherein the step of the central station communicating with the pay-viewing system or the second pay-viewing system includes a step of the pay-viewing system or the second pay-viewing system authorizing the second pay-viewing system or the pay-viewing system to carry the event ordered by the subscriber.

11. A method of ordering and paying for pay-per-view events comprising:

a) providing a pay-television system having a multiplicity of offerings including pay-per-view events;
b) providing a subscriber account in the pay-television system;
c) sending a bill to a subscriber at a billing location which charges the subscriber for usage of the pay-television system, including usage of pay-per-view events;
d) identifying a home base for the subscriber;
e) providing the subscriber with a credit card associated with the pay-television system;
f) locating the subscriber at a location remote from the home base;
g) ordering an offering from the pay-television system to be sent to the subscriber at the remote location by the pay-television system by
   (1) communicating with the pay-television system from the remote location,
   (2) identifying the credit card which will be charged for the offering,
   (3) identifying the event being ordered for delivery at the remote location,
   (4) identifying the remote location as being a receiving location to which the pay-television system is to send the event being ordered,
   (5) providing information regarding the remote location, and
   (6) authorizing payment for the event to be charged to the credit card;
h) charging the credit card with a charge according to the event ordered on the credit card;
i) billing the subscriber at the home base according to charges on the credit card; and
j) providing a central station; and
k) wherein the step of communicating with the pay-television system from the remote location includes communicating via the central station and the central station relaying the communication to the pay-television system.

* * * * *